(12) United States Patent
Farr

(10) Patent No.: US 7,212,555 B2
(45) Date of Patent: May 1, 2007

(54) METHODS AND DEVICES FOR MONITORING THE WAVELENGTH AND POWER OF A LASER

(75) Inventor: Mina Farr, Palo Alto, CA (US)

(73) Assignee: Finisar Corporation, Sunnyvale, CA (US)

( * ) Notice: Subject to any disclaimer, the term of this patent is extended or adjusted under 35 U.S.C. 154(b) by 172 days.

(21) Appl. No.: 10/700,306

(22) Filed: Oct. 31, 2003

(65) Prior Publication Data

US 2004/0090620 A1 May 13, 2004

Related U.S. Application Data

(60) Provisional application No. 60/422,974, filed on Nov. 1, 2002.

(51) Int. Cl.
*H01S 3/13* (2006.01)
(52) U.S. Cl. .......................... 372/32; 372/20
(58) Field of Classification Search .................. 372/32, 372/20, 29.02, 33
See application file for complete search history.

(56) References Cited

U.S. PATENT DOCUMENTS

| | | | |
|---|---|---|---|
| 3,725,817 A * | 4/1973 | Nolan ........................... 372/15 |
| 4,583,227 A * | 4/1986 | Kirkby .......................... 372/32 |
| 4,998,256 A * | 3/1991 | Ohshima et al. ............... 372/32 |
| 5,319,435 A | 6/1994 | Melle et al. |
| 5,469,265 A | 11/1995 | Measures et al. |
| 5,812,581 A * | 9/1998 | Cox ......................... 372/50.21 |
| 5,963,686 A * | 10/1999 | Zheng et al. .................. 385/27 |
| 6,122,301 A * | 9/2000 | Tei et al. ....................... 372/32 |
| 6,289,028 B1 * | 9/2001 | Munks et al. .................. 372/20 |
| 6,366,592 B1 * | 4/2002 | Flanders ....................... 372/18 |
| 6,587,214 B1 * | 7/2003 | Munks .......................... 356/519 |
| 2002/0001321 A1 * | 1/2002 | Perry ........................... 372/22 |
| 2002/0141463 A1 * | 10/2002 | Bruun-Larsen et al. ..................... 372/29.021 |

* cited by examiner

*Primary Examiner*—Minsun Oh Harvey
*Assistant Examiner*—Tuan N. Nguyen
(74) *Attorney, Agent, or Firm*—Workman Nydegger

(57) ABSTRACT

A wavelength locker. The wavelength locker can be mounted within an optical transceiver on a submount with the laser diode. The wavelength locker utilizes light emitted by the back facet of the laser to monitor the wavelength and power of the laser. The light is separated into two portions, at least one of which is passed through a filter to shift the wavelength thereof. Separate monitor diodes or photosensitive areas of a single monitor diode are used to measure the output of each portion of light. The outputs are analyzed to determine the wavelength of the light emitted from the back facet as well as the power of the laser and a controller can then change the temperature of the laser or otherwise adjust the wavelength of the laser when the wavelength locker detects that the wavelength of the laser is changing.

25 Claims, 9 Drawing Sheets

METHODS AND DEVICES FOR MONITORING THE WAVELENGTH AND POWER OF A LASER

CROSS-REFERENCE TO RELATED APPLICATIONS

This application claims the benefit of U.S. Provisional Application No. 60/422,974, filed Nov. 1, 2002 and entitled MONITORING THE WAVELENGTH AND POWER OF A LASER, which is hereby incorporated by reference.

BACKGROUND OF THE INVENTION

1. The Field of the Invention

The present invention relates to systems and methods for monitoring a laser's wavelength and power. More particularly, the present invention relates to systems and methods for monitoring the wavelength and power of a laser by integrating the laser monitor with a transceiver.

2. Background and Relevant Art

Computer and data communications networks continue to develop and expand due to declining costs, improved performance of computer and networking equipment, the remarkable growth of the internet, and the resulting increased demand for communication bandwidth. Such increased demand is occurring both within and between metropolitan areas as well as within communications networks. These networks allow increased productivity and utilization of distributed computers or stations through the sharing of resources, the transfer of voice and data, and the processing of voice, data, and related information at the most efficient locations.

Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of fiber optic systems required.

Through fiber optics, digital data in the form of light signals is formed by light emitting diodes or lasers and then propagated through a fiber optic cable. Such light signals allow for high data transmission rates and high bandwidth capabilities. Other advantages of using light signals for data transmission include their resistance to electro-magnetic radiation that interferes with electrical signals; fiber optic cables' ability to prevent light signals from escaping, as can occur electrical signals in wire-based systems; and light, signals' ability to be transmitted over great distances without the signal loss typically associated with electrical signals on copper wire.

Wavelength Division Multiplexing (WDM) is a technique that increases the effective bandwidth of optical communications. The advantage of WDM systems is that multiple carrier wavelengths can be used to transmit data simultaneously as long as the carrier wavelengths do not interfere with each other. For example, channel spacing in the Dense Wavelength Division Multiplexing (DWDM) systems could range from 100 GHz down to 50 or 25 GHz.

Even though WDM is able to increase the effective bandwidth of optical communication systems, it is usually necessary to have precise control over the transmission or carrier wavelengths. The control over the carrier wavelengths is necessary in order to provide stable communication. Problems in WDM systems occur when the wavelengths begin to drift and thereby interfere with other carrier wavelengths. The need to monitor the carrier wavelengths becomes more important as the channel spacing becomes closer. Thus, monitoring the carrier wavelengths is particularly useful in DWDM rather than CWDM (Coarse WDM) systems.

Wavelength drift can occur for a variety of different reasons. Wavelength drift can occur, for example, when optical elements within a WDM system experience a temperature variation. This is particularly true with the laser, whose transmission wavelength is affected by temperature. The lasers of a WDM system are usually mounted to a thermo-electric cooler (TEC) that is designed to keep the laser at a fairly constant temperature. The wavelength generated by the laser can be controlled by adjusting the drive current and therefore the temperature of the TEC. The age of a particular laser also has an impact on wavelength drift. As a laser ages, the output wavelength changes.

Regardless of why the wavelength of a laser changes, it is necessary to ensure that the wavelength remains relatively constant during operation. To achieve this goal, WDM systems often implement an external feedback loop that is used to correct the wavelength being generated by the laser. In order to monitor the laser, a small portion of the laser output is siphoned off and sent to an optical element that can identify the wavelength of the laser light. The optical element is often referred to as a wavelength or channel monitor. The output of the wavelength monitor can be used to control the TEC, which controls the temperature of the laser and, ultimately, the wavelength of light emitted by the laser. The complete function is referred to as wavelength locking.

One of the problems associated with monitoring the transmission wavelength of a laser is that the optical elements needed to monitor the wavelength are not an integral part of an optical transceiver. Thus, a portion of the laser light must be isolated or siphoned off and fed, for example, to an external wavelength monitor.

Accordingly, there is a continuing need for improved methods and devices monitoring the wavelength and power of a laser.

BRIEF SUMMARY OF THE INVENTION

The present invention relates to systems and methods for monitoring and tuning the transmission wavelength of a laser. Monitoring and tuning the transmission wavelength is achieved through the use of a wavelength locker that is formed as an integral part of an optical transceiver. In one embodiment, the wavelength locker replaces the back facet power monitor of the laser and eliminates the need for extra space to accommodate the wavelength locker.

The wavelength locker, in one embodiment, includes a split photodetector. The photosensitive areas of the photodetector are coated with necessary optical coatings. The respective halves of the photodetector are coated such that the transmission characteristics of the filter on one half of the detector is changed in a complementary manner due to any shift in wavelength with respect to the transmission, of the filter on the other half of the photodetector for the same wavelength shift.

For example, using two edge filters, one short-pass filter and one long-pass filter, the center wavelength of the first filter is selected such that the desired transmission wavelength of a laser falls in the middle of a cutoff or edge region of the filter transmission curve. The other filter is selected such that the wavelength of the laser falls in the middle of the opposite edge/cutoff region of the filter transmission curve. Using this filter, the wavelength dependent signal of the split detector is a differential of the optical signal passed through these filters, onto each of the corresponding detector halves. The differential detection of wavelength is immune to any laser output power variation due to common mode noise rejection that is inherent in the differential signal detection. The sum of the two detector halves can still be used as a back facet laser power monitor.

Accordingly, a first example embodiment of the invention is a wavelength locker for determining the wavelength of laser light emitted by a laser diode. The wavelength locker includes: a first photosensitive area; a second photosensitive area; means for receiving laser light from a laser diode and directing a first portion of the laser light onto the first photosensitive area and a second portion of the laser light onto the second photosensitive area; and an optical filter that modifies the portion of the laser light that is directed to the photosensitive area. The detection response of the first photosensitive area and the detection response of the second photosensitive area are used to determine the wavelength and power of the laser light emitted by the laser diode.

A second example embodiment of the invention is a wavelength locker for determining the wavelength of laser light emitted by a laser diode. The wavelength locker includes: a reflective surface that receives laser light from a back facet of a laser diode and redirects the laser light; a lens that receives the laser light from the reflective surface, wherein the lens collimates the laser light; a filter layer that comprises a first filter, wherein the filter layer receives the collimated light from the lens; and a detector including a first photosensitive area and a second photosensitive area, wherein the first photosensitive area receives light through the first filter to detect a first signal and the second photosensitive area receives light that does not pass through the first filter, wherein the detection response of the first photosensitive area and the detection response of the second photosensitive area used to determine the wavelength and power of the laser light emitted by the laser diode.

Another example embodiment of the invention is also a wavelength locker mounted on a submount with a laser diode. This wavelength locker includes a power monitor photodiode that receives laser light from a back facet of a laser diode, wherein the power monitor diode determines the power of the laser light; a reflective surface of the power monitor photodiode that receives and redirects the laser light; a lens that receives the laser light from the reflective surface, wherein the lens collimates the laser light; a filter layer that receives the collimated light from the lens and modifies the laser light; and a detector including a photosensitive area, wherein the photosensitive area receives and detects light through the filter layer, wherein the wavelength of the laser light is determined from an analysis of the determined power of the laser light and the detection response of the photosensitive area.

Yet another example embodiment of the invention is an optical transceiver that includes a wavelength locker. The optical transceiver includes: a laser diode that emits laser light from front and back facets thereof; a controller module that modifies the wavelength of the laser light based upon a determined wavelength of the laser light; and a wavelength locker that determines the wavelength of the laser light. The wavelength locker may be any of the various embodiments disclosed herein. For example, the wavelength locker may include a prism that receives laser light from a back facet of a laser diode; a first lens that receives the laser light reflected by the prism, wherein the first lens collimates the laser light; a filter layer that includes a first filter, wherein the first filter receives the collimated light from the first lens; and a detector including a first photosensitive area and a second photosensitive area, wherein the first photosensitive area receives light through the first filter to detect a first signal and wherein the second photosensitive area receives light that does not pass through the first filter to detect a second signal, wherein a wavelength of the laser diode is determined from the first signal and the second signal.

An example method of determining the wavelength of light emitted by a laser diode according to the invention includes: receiving light from the back facet of a laser diode; separating the light into a first portion and a second portion; passing the first portion of light through a first filter and onto a photosensitive surface, the first filter modifying the transmitted power of the first portion of the light with any shift in the wavelength by a selected amount; passing the second portion of light onto a second photosensitive surface; and using the output of the first photosensitive surface and the second photosensitive surface, determining the wavelength of the light emitted by the laser diode.

These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention relates to devices and methods to monitor the wavelength and power of light generated by a laser diode. Monitoring laser light is important because the wavelength of laser light tends to drift, which can have a very negative impact on the performance of many optical systems, for example WDM systems. This is particularly true as the channel spacing of a WDM system becomes denser. In a 100 GHz channel spacing DWDM system, for example, the channels are approximately 0.8 nm apart in wavelength. Some lasers have a temperature coefficient of 0.1 nm/° C. Thus, a temperature fluctuation of only 10° C. could shift the wavelength by 1 nm, which would result in signal overlap. To prevent such a wavelength shift, many lasers include a system, such as a thermistor and a thermoelectric cooler, for maintaining the laser within a specified temperature range.

Nevertheless, the temperature of the laser can only be adjusted appropriately after determining the transmission wavelength of the laser. Functionally, this is achieved by determining the wavelength of the emitted wavelength and adjusting the temperature of the laser as needed. The present invention therefore relates to systems and methods for detecting and monitoring the wavelength of a laser and more particularly relates to a wavelength locker for detecting and fixing or locking the wavelength of a laser. The present invention also monitors the power of a laser.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of network systems have not been described in particular detail in order to avoid unnecessarily obscuring the present invention.

Figure 1:
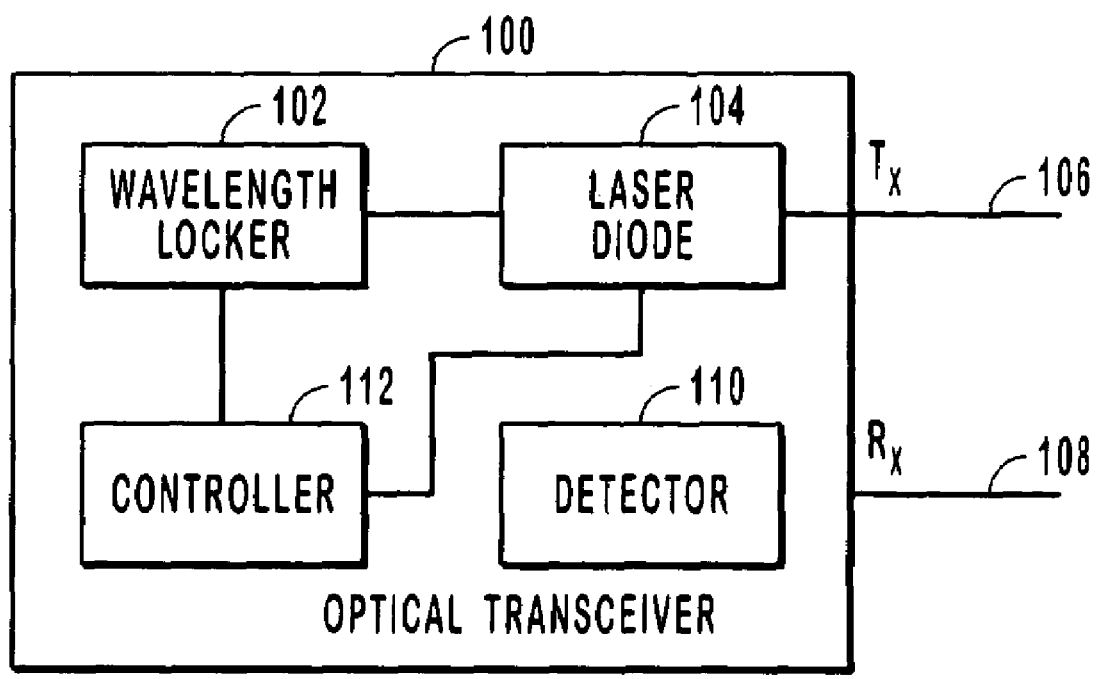
FIG. 1 illustrates a wavelength locker within an optical transceiver for monitoring the wavelength and/or power of a laser diode according to one embodiment of the invention.

FIG. 1 is a block diagram illustrating an optical transceiver. The optical transceiver 100 includes a laser diode 104. Generally, optical transceivers operate to convert electric signals to optical signals and convert optical signals to electrical signals. For example, the transceiver 100 receives an optical signal at detector 110 from an attached optical fiber 108. That optical signal is translated by the receiver and other devices in the transceiver 100 into an electric signal that can be analyzed by other electrical devices. In addition, the transceiver 100 transmits an optical signal via attached optical fiber 106. That optical signal is generated, in part, by laser diode 104.

The laser diode 104 may be any suitable light source including, but not limited to, an electroabsorptive modulated laser (EML), a DFB laser, a VCSEL, and the like. The laser diode 104 generates laser light that has a wavelength. Of course, it will appreciated by those skilled in the art that other light signal sources, such as, for example, edge and surface light emitting diodes (LEDs) may be compatible with embodiments of the invention. Hence, it will be understood that the term "laser diode" is used herein for simplicity in describing the invention but that other light emitting devices may be used. In FIG. 1, it can be seen that the laser light generated by laser diode 104 is launched into optical fiber 106.

As previously mentioned, however, wavelength drift can have a detrimental effect upon the operation of a transceiver. In order to optimize the performance of a transceiver, it is therefore important to accurately monitor the transmitted wavelength of the laser diode and make any necessary adjustments to maintain the wavelength within a desired range. Accordingly, transceiver 100 detects and monitors the wavelength of laser diode 104 by the wavelength locker 102. The controller 112, in turn, adjusts the temperature of the laser diode 104 according to the wavelength that is detected by the wavelength locker 102.

Figure 2:
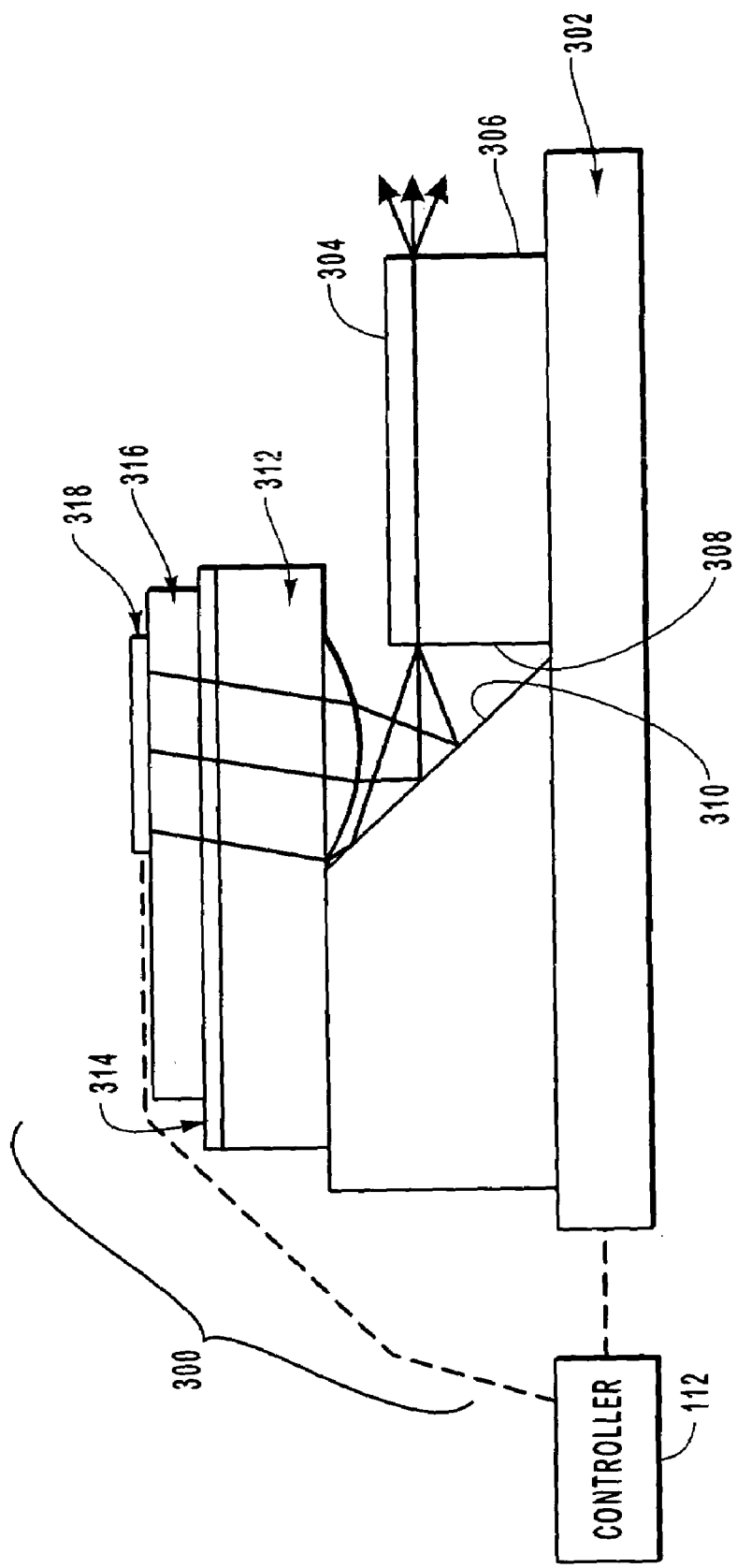
FIG. 2 illustrates a wavelength locker (in a cross-sectional view) that monitors the wavelength and/or power of a laser diode using light emitted by the laser according to another embodiment of the invention.

Referring now to FIG. 2, depicted is a block diagram side view of a wavelength locker 300 that is an integral part of an optical transceiver according to the invention. As previously mentioned, the temperature of the laser diode 304 can only be adjusted appropriately after determining the transmission wavelength of the laser. Functionally, this is achieved by using wavelength locker 300 to determine the wavelength of the emitted light and adjusting the temperature of the laser as needed. Wavelength locker 300 also monitors the power of a laser and therefore occupies a place within the optical transceiver that would otherwise be occupied with a power monitor.

Wavelength locker 300 is mounted on a submount 302 which could be positioned on a thermoelectric cooler (TEC). Also mounted on submount 302 is a laser diode 304. The laser diode 304 may be any suitable light source including, but not limited to, an EML, a DBF laser, and the like. The laser diode 304 includes a front facet 306 and a back facet 308. The laser light exiting the front facet 306 is launched into other optical devices, for instance, an optical fiber. The wavelength locker 300 utilizes the laser light exiting the back facet 308 of the laser diode 304 to monitor the wavelength and power of the laser diode 304. It will be understood by those skilled in the art that, although reference is frequently made herein to receiving the laser light from a back facet of the laser diode, the laser light may be received indirectly or directly from the back facet. In other words, mirrors or other optical devices may be used to route the laser light as needed. Nevertheless, it is particularly preferred that the laser light be directly communicated from the back facet of the laser diode to the referenced optical component.

Depending on the actual wavelength emitted by the laser diode 304, a controller 112 will cause the TEC to alter the temperature of the laser diode 304, thereby altering the transmission wavelength of the laser diode 304. The controller 112 makes a decision based on the wavelength detected by the wavelength locker 300.

In the embodiment depicted in FIG. 2, the wavelength locker 300 includes a prism 310 (or other mirror or reflective element), one or more collimating lenses 312, a filter 314, a detector substrate 316 and one or more detectors 318. More generally, however, the prism and collimating lens may be substituted by other means for receiving laser light from a back facet of a laser diode and directing one or more portions of laser light onto or more detectors or detective surfaces. Such means may include, for example, any combination of: prisms, mirrors, reflective surfaces, diffractive or holographic optical elements, lenses, dielectric filters; etalons, beam splitters, other passive or active optical devices known in the art for separating and routing light beams, and multiples and combinations thereof. The laser light that exits the back facet 308 of the laser diode 304 is reflected by the prism 310 towards the lens 312. The lens 312 collimates the laser light and enables the light to be directed at a specific angle on the filter 314 so the filter may operate as designed. In addition, using the lens 312 to direct and collimate the laser light can reduce or eliminate the filter transmission response averaging effect of having the laser light directed at the filter from multiple incident angles. The lens 312, can also be adjusted in position to improve and fine tune the response of the wavelength locker 300.

The lens 312, as previously indicated, reduces the number of incident angles of light on the filter 314 by collimating the light, such that the filter 314 is not compromised. As depicted in FIG. 2, lens 312 may have a rectangular shape with a light transmitting portion having a curved section of the lens at one end of lens 312. In one embodiment, lens 312 can have an aspheric or spherical surface that is configured to collimate light incident thereupon.

The lens may be formed by semiconductor wafer fabrication techniques that are known in the art. In a reflow process, for example, polymeric materials are patterned on substrates and then melted on the polymer to form ideal aspherical surfaces. These patterns are then transferred into the substrate by one of various plasma etching techniques. One such microlens fabrication technique involves forming squat cylinders of photoresist on a silicon substrate using conventional lithography. The substrate is then heated above the glass reflow temperature of the photoresist, allowing it to reflow. This creates a series of spherical surfaces, each with a radius that may be predicted from the volume of resist and the area of contact with the substrate.

The lens profiles are then transferred into the substrate material, often with 1:1 selectivity. This is performed as a high frequency, high power signal is inductively coupled into a vacuum chamber containing reactive gases at low pressure to form a high-density plasma. The substrate to be etched is mounted on a driven stage remotely from the plasma generation region. The bias on the stage is controlled by applying a second RF signal at a different frequency and the substrate is etched.

Such inductively coupled plasma dry etch tools allow control of selectivity between the substrate and a photoresist mask, permitting adjustment of lens properties. Lenses produced by the foregoing method can have a wide range of design parameters over a wide range of numerical apertures, including aspheric design over a broad range of conic values. Microlenses can be formed in InP, GaP, quartz and silicon, for example, although silicon is presently preferred.

The detectors 318 may be, for example, photodiodes that can convert the laser light into a measurable electrical signal.

Figure 3:
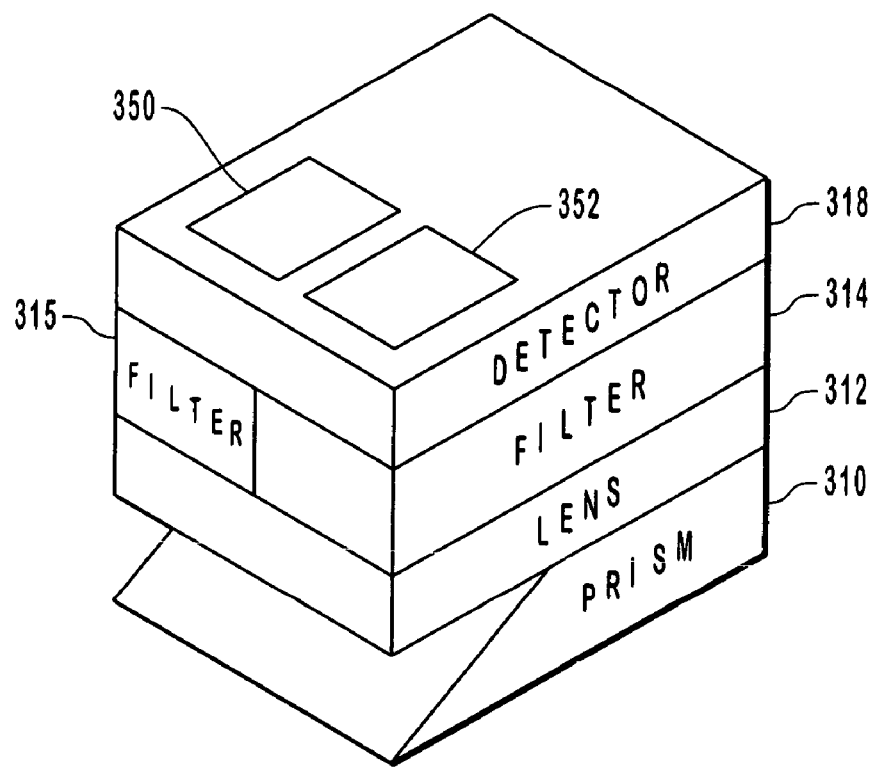
FIG. 3 illustrates a perspective view of a wavelength locker that uses two photosensitive areas and one filter to detect and monitor the wavelength and/or power of a laser according to another embodiment of the invention.

FIG. 3 is a perspective view of the wavelength locker 102 that enables a better view of the filter 314. As depicted, the filter 314 filters one portion of the light passing through the wavelength locker while filter 315 filters as second portion of the light passing through the wavelength locker. Alternatively, one filter is omitted and in its place an optically passive spacer takes it place.

FIG. 3 also more fully illustrates that the detector 318 in FIG. 2 includes two different photosensitive areas: photosensitive area 350 and photosensitive area 352. In this case, the photosensitive area 350 of the detector 318 detects laser light that passes through the filter 315 with its corresponding transmission response, while, the photosensitive area 352 detects laser light that directly passes through the filter 314 with its corresponding transmission response. Using the wavelength dependent signal from the light detected by the photosensitive areas 350, 352 for wavelength detection and/or the non-wavelength dependent optical power (signal) from either photosensitive area for power detection, both power and/or wavelength of the laser light can be determined. In the event that a non-differential detection of wavelength signal (single ended, using a single filter response) is used, it would be inherently laser power dependent, and successful detection of wavelength would ultimately depend on the accuracy of keeping the laser power constant, by adjusting the bias current to the laser, using the power signal detected by one of the photosensitive areas.

Figure 4:
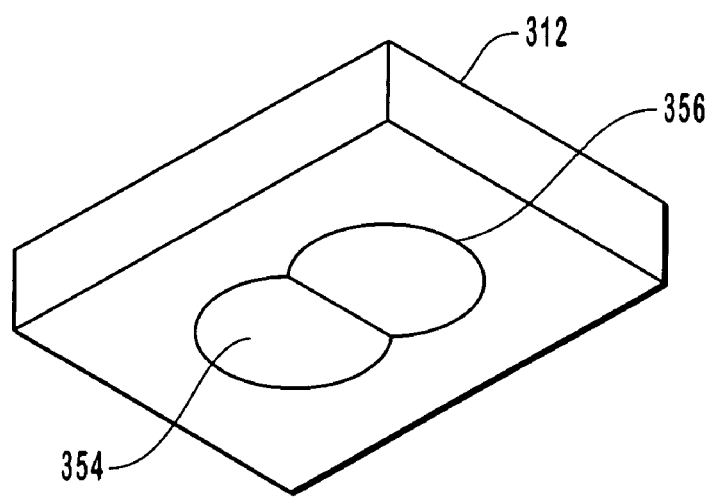
FIG. 4 is a perspective view of a lens that collimates and directs laser light onto filters according to another embodiment of the invention.

FIG. 4 is a perspective view one embodiment of a lens, such as lens 312. The lens 312 includes, in this embodiment, a collimating element 354 and a collimating element 356. Each collimating element can have an impact on the incident angle of the laser light on the filter. This has an effect on the response of the filter, whose transmission is related to the incident angle of the optical signal or laser light. By changing the respective collimating elements or position of the lens enables the filter to be utilized more effectively. The lens collimating elements 354 and 356 can be used to change the angle at which the light is incident on the filters. The lenses or collimating elements also collimate the laser light on the filter in such a way that an averaging effect in the filter transmission response that is dependent on the incidence angle of the light rays is avoided keeping the transmission response of the filter edge sharp enough for high resolution wavelength detection.

Figure 5:
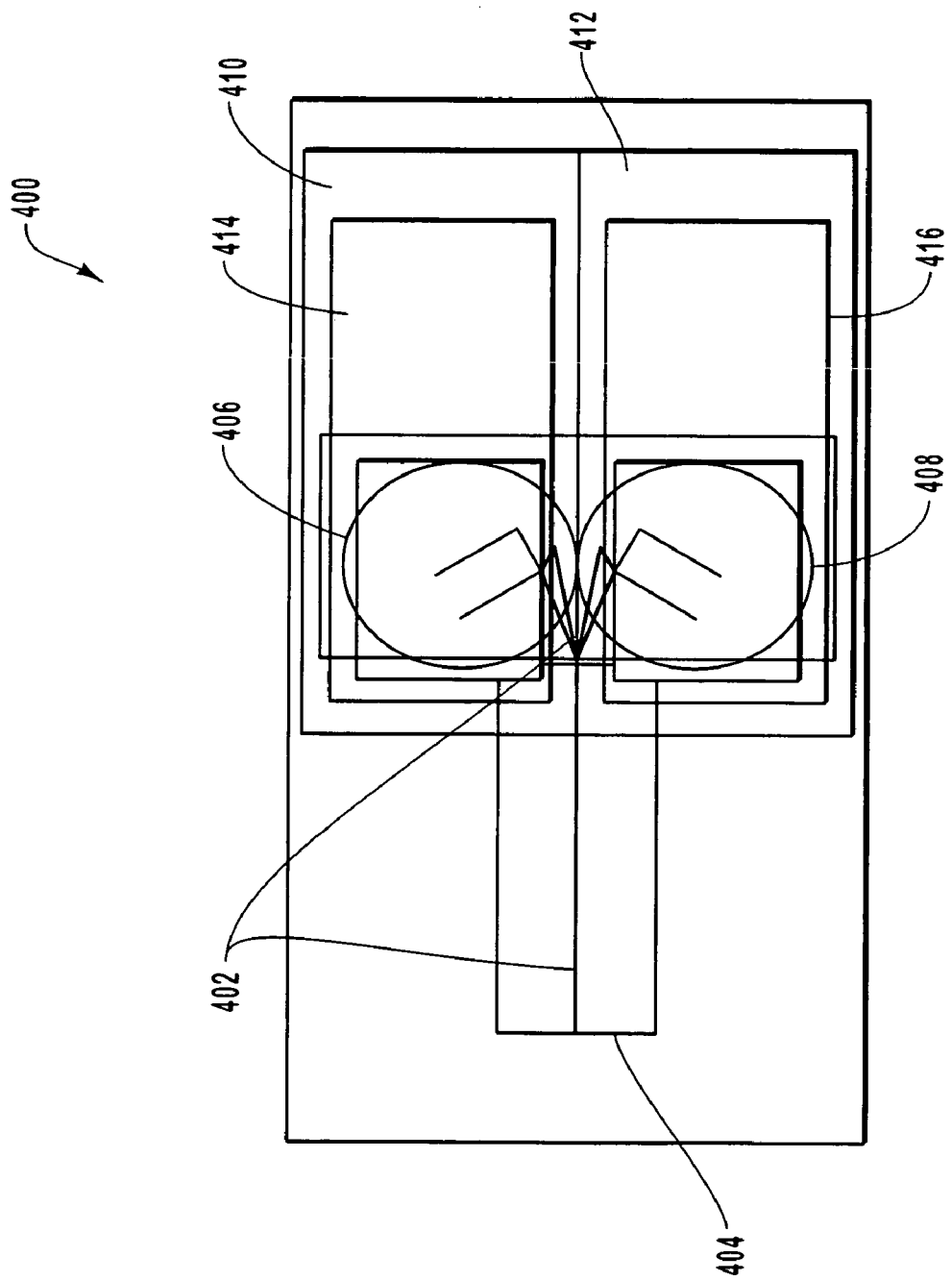
FIG. 5 is a top view of a wavelength locker that uses two photosensitive areas and at least one filter to detect and monitor the wavelength and/or power of a laser according to another embodiment of the invention.

Referring now to FIG. 5, a top view of wavelength locker 400 is presented to illustrate further features of the functioning of the herein disclosed wavelength lockers. Accordingly, as a light signal 402 exits laser diode 404, the light signal 402 experiences its characteristic spread or emission pattern. The light signal 402 in its emission pattern reflects off a prism (not depicted) and reflects upward toward first and second microlenses 406, 408 (see lenses 354, 356 in FIG. 4). First and second microlenses collimate the light impingent thereupon so that it contacts filters 410, 412 at a uniform angle. Light signal 402 thus is divided into separate beams that pass through microlenses 406, 408 and filters 410, 412 and contacts power monitor and wavelength locker sensors 414 and 416.

Figure 6:
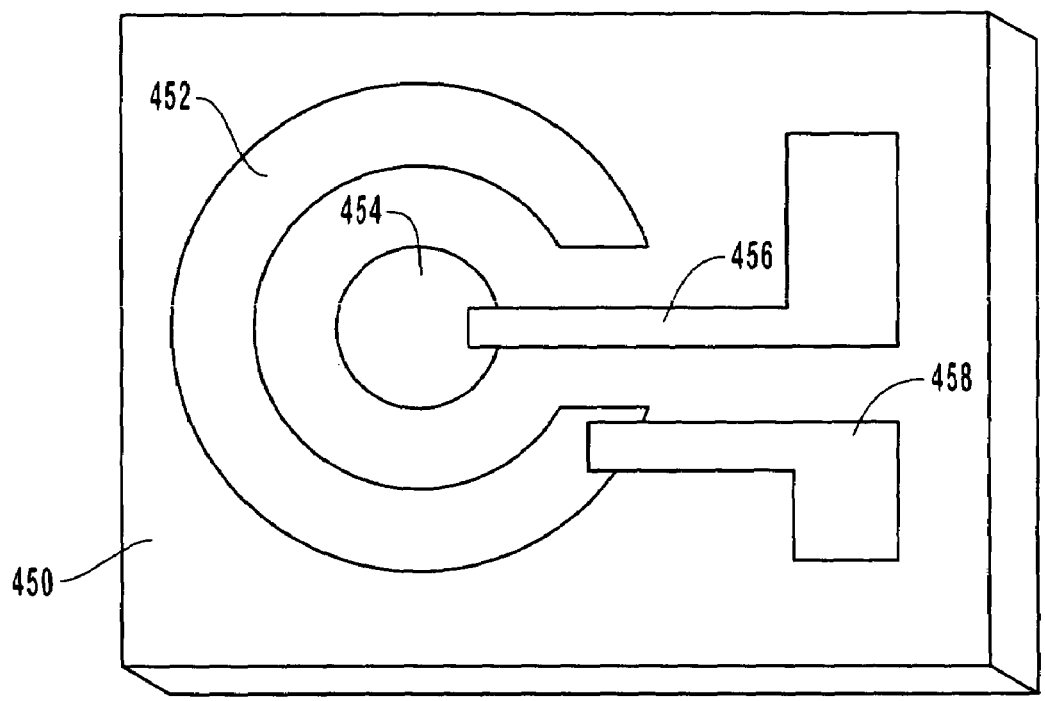
FIG. 6 is a top view of a detector that uses two photosensitive areas to detect and monitor the wavelength and/or power of a laser according to another embodiment of the invention.

FIG. 6 illustrates another embodiment of the invention wherein a detector substrate 450 has thereupon two concentrically configured photosensitive areas 452, 454. The first photosensitive area 454 is centrally located and has an electronic lead 456 in communication therewith and the second photosensitive area 452 is substantially surrounds the first photosensitive area 454 in a concentric arrangement with electronic lead 458 in communication therewith. In this embodiment, the associated lens does not require two separate collimating lenses. Rather, a single lens can be used to substantially collimate light onto the first photosensitive area 454 while the second photosensitive area 452 receives the outer portion of the collimated light, or non-collimated light that passes directly outside the lens aperture, impingent on the photosensitive area 452, without any influence in it's direction by the lens power. Thus, the first photosensitive area 454 will receive light that is filtered and is used to determine the wavelength of the light emitted by the laser diode (by a differential analysis with respect to the overall light power) while the second photosensitive area 452 receives unfiltered light and is used to determine the power of the light emitted by the laser diode.

Figure 7:
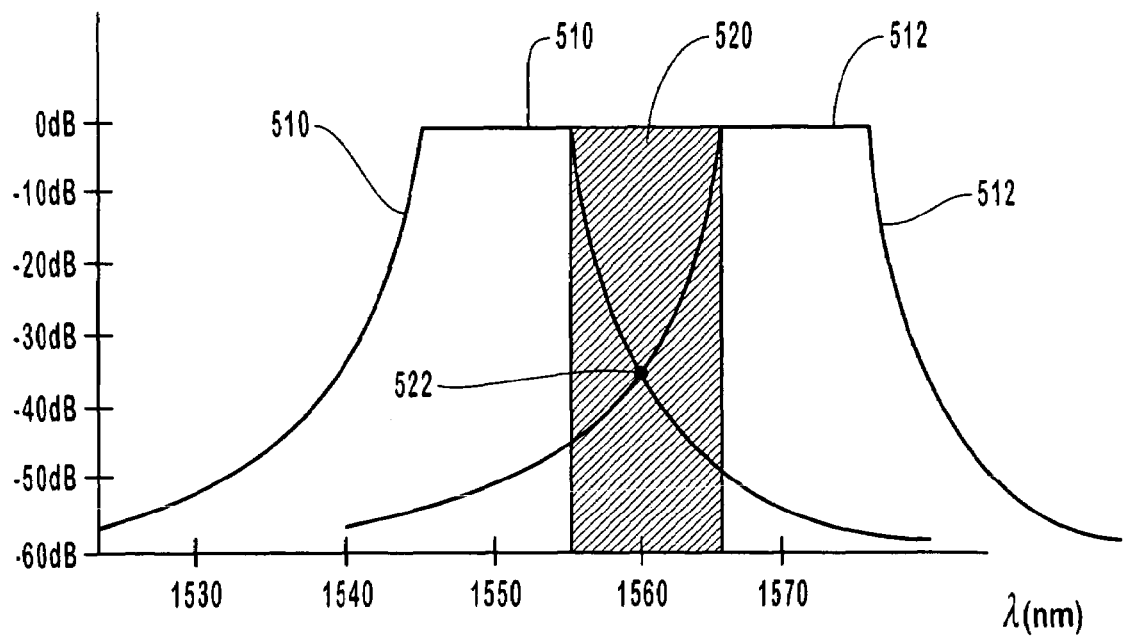
FIG. 7 illustrates the transmission response of two separate filters and illustrates the wavelengths that are detected by the wavelength locker by combining the signals that are detected using these two filters.

FIG. 7 is an example of the response at the two photosensitive areas according to the invention, for example the photosensitive area 350 and the photosensitive area 352 in FIG. 3. The response 510 corresponds to the photosensitive area 350, where the light that is impinging on it is passed through and modified in transmission power by filter 315. The response 512 corresponds to the photosensitive area 352 and the filter 314 transmission response. In this example, the desired emission transmission wavelength of the laser is 1560 nanometers. The filter 315 is designed such that the laser wavelength to be locked (1560 nm) falls in the middle of the cutoff region or filter edge as shown at point 522. The photosensitive area 352 is designed such that the wavelength to be locked falls in the middle of the opposite cutoff region also represented by the point 522. The shaded region 520 thereby corresponds to the detection region of the corresponding photosensitive areas 350 and 352, which are aligned to receive the transmission output from the filters 315 and 314.

Each half of the detector 318 receives a signal that is dependent on the associated filter (or lack thereof). Thus, because each sensitive area (350, 352) receives a light signal that is filtered different than the other sensitive area, the detector 318 is a split detector. The wavelength emitted by the laser diode can therefore be calculated as a differential of the optical signal or laser light that is incident upon the photosensitive areas 350 and 352. In other words, the relative proportions of light that reach each of the photosensitive areas are indicative of the wavelength emitted by the laser diode. If the center wavelength of the laser diode shifts below 1560 nm, a higher signal detection will occur at photosensitive area: 350, and at the same time a lower signal is detected at the photosensitive area 352. If the center wavelength of the laser diode shifts above 1560 nm, a higher signal detection will occur at sensitive area 352 and a lower signal is detected at the photosensitive area 350.

In addition, using the same two detectors and filter combination, one can identify the laser power monitoring signal from the sum of the two optical signals. Obtaining a differential signal in this way for wavelength monitoring, and the sum signal as power monitoring, allows one to have two independent monitoring signals from the dual detectors. With any change in the laser power, the differential wavelength signal is unaffected, and with any wavelength changes, the sum power signal is intact. The differential wavelength signal is also immune to common noise affecting the split detector signals of detector 318.

FIGS. 8 through 13 illustrate different embodiments of a wavelength locker. Each of the embodiments illustrated in FIGS. 8 through 13 are able to detect the wavelength and power of the laser light as described previously.

Figure 8:
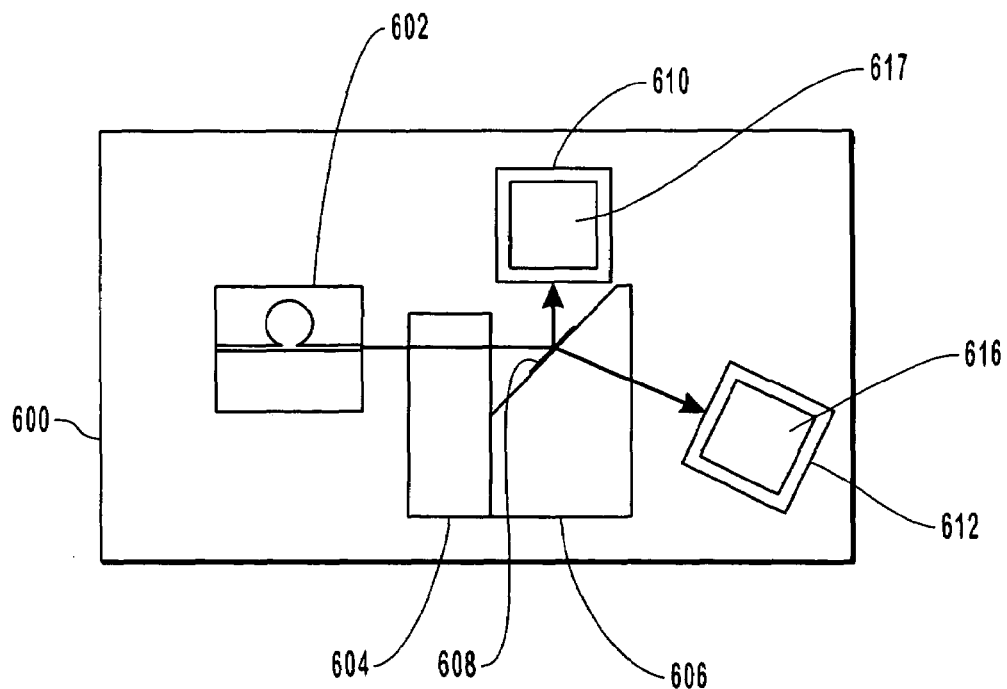
FIG. 8 illustrates one embodiment of a wavelength locker mounted on a submount with a laser diode.

FIG. 8 illustrates various devices positioned on a submount 600. More particularly, FIG. 8 illustrates that a laser diode 602 emits laser light, which passes through a silicon lens 604 to a prism 606 that is coated with a dielectric filer 608. The filter 608 directs portions of the light to each of a first monitor diode 610 and a second monitor diode 612 such that the wavelength of the laser light can be monitored by photosensitive areas 617, 616 on each monitor diode. The prism of FIG. 8 could be replaced by a glass block. The dielectric filter can be tuned to a particular wavelength by changing the angle at which the laser light is incident to the filter. The filter 608, by the virtue of its complementary reflection and transmission characteristics can automatically provide the complementary or symmetric edge profile responses depicted in area 520 of FIG. 4, on the two photosensitive areas of 617 and 616 of the monitor diodes 610 and 612.

Figure 9:
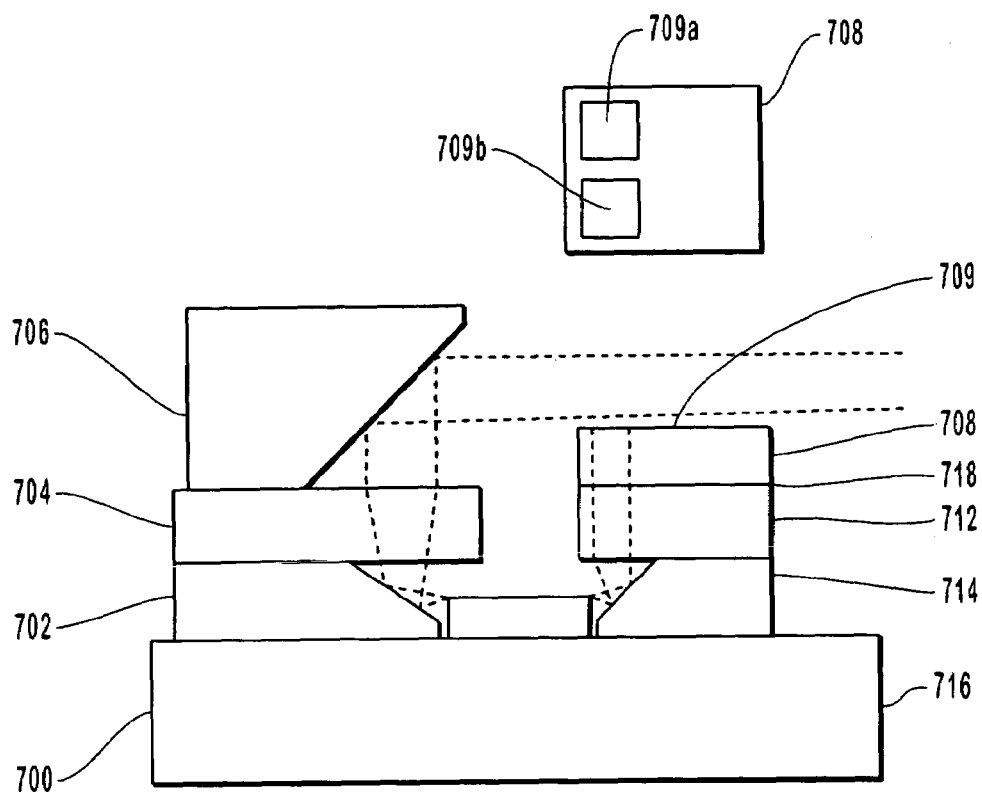
FIG. 9 illustrates another embodiment of a wavelength locker.

In FIG. 9, the wavelength locker includes a backside mirror 714 that receives the light from the back facet of the laser diode 700 and reflects the laser light through a lens 712. A filter coating (not depicted) is deposited directly on the lens 712 functions as previously described and the monitor diode 708, which has photosensitive areas 709a, 709b, detects the laser light. Note that the filter is typically divided into two parts that each have different characteristics as previously described. The lens element 712 depicted in this embodiment can also be replaced with a diffractive element that has the same type dual diffractive lens elements to collimate and split the light for the corresponding dual filter and photo-detector paths. In an alternative approach the lens element 712, with its dual filter coating, can also be replaced by a combination holographic element that is designed to perform same necessary functions as collimation, beam splitting, and appropriate filter response.

FIG. 9 also illustrates components that direct the laser light to be launched from the front facet of the laser diode 700. In order to launch the laser light emitted from the front facet of the laser diode to other optical component in a transmitter, the diverging laser light from laser diode 700 is received and reflected by a first mirror 702 onto a silicon lens 704. The silicon lens 704 collimates the light onto a second mirror 706, which in turn directs the laser light in the desired direction.

Figure 10:
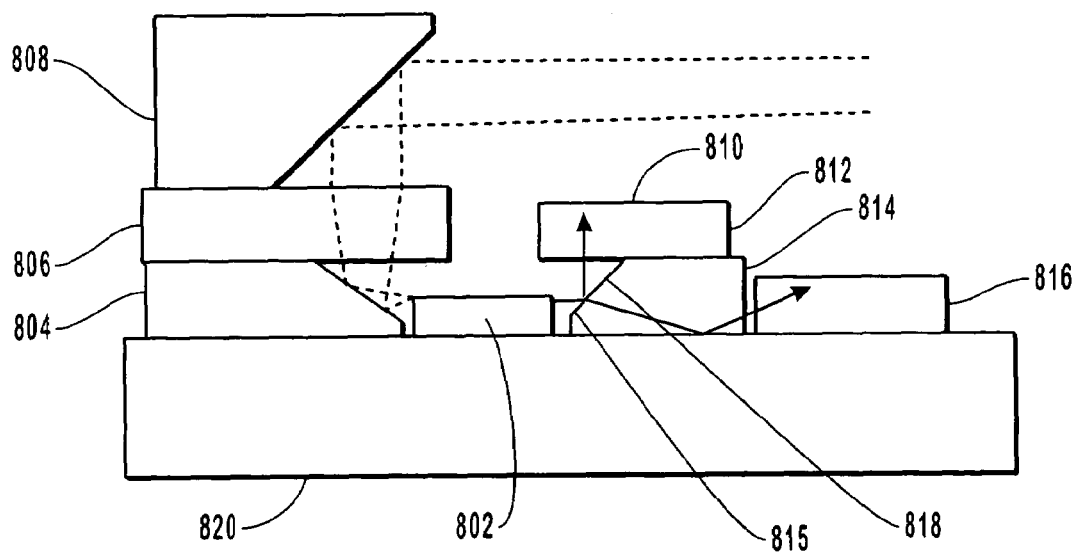
FIG. 10 illustrates an embodiment of a wavelength locker that utilizes a beamsplitter to direct the laser light to the photosensitive areas of monitor diodes.

FIG. 10 illustrates a wavelength locker that includes a beamsplitter 814 having an angled edge on its front surface 815. The beamsplitter is configured to receive the light emitted by the back facet of the laser diode 802. This light emitted by the back facet of the laser diode 802 is used to monitor and correct the wavelength and/or power of the laser diode 802. The beamsplitter 814 may have optical films 818 formed thereon to filter the laser light. The beamsplitter 814 directs some of the light to the monitor diode 812 and photosensitive area 810 while the beamsplitter 814 directs the other part of the laser light to the monitor diode 816 and its respective photosensitive area. As illustrated, a portion of the light reflected toward the second monitor diode 816 may be reflected off the bottom surface of the beamsplitter on the submount 820 on its way to the second monitor diode 816. Using the signals detected by the monitor diodes 812 and 816, the wavelength and power of the laser light can be determined as previously described.

FIG. 10 also illustrates the forward path of the laser light that is being used or emitted by the laser diode 802. In other words, the light that is emitted from the front facet of the laser diode 802 is ultimately launched or otherwise used in a system or optical network. Thus, the mirror 804, lens 806, and mirror 808 are used to redirect the laser light from the front facet of the laser diode 802.

Figure 11:
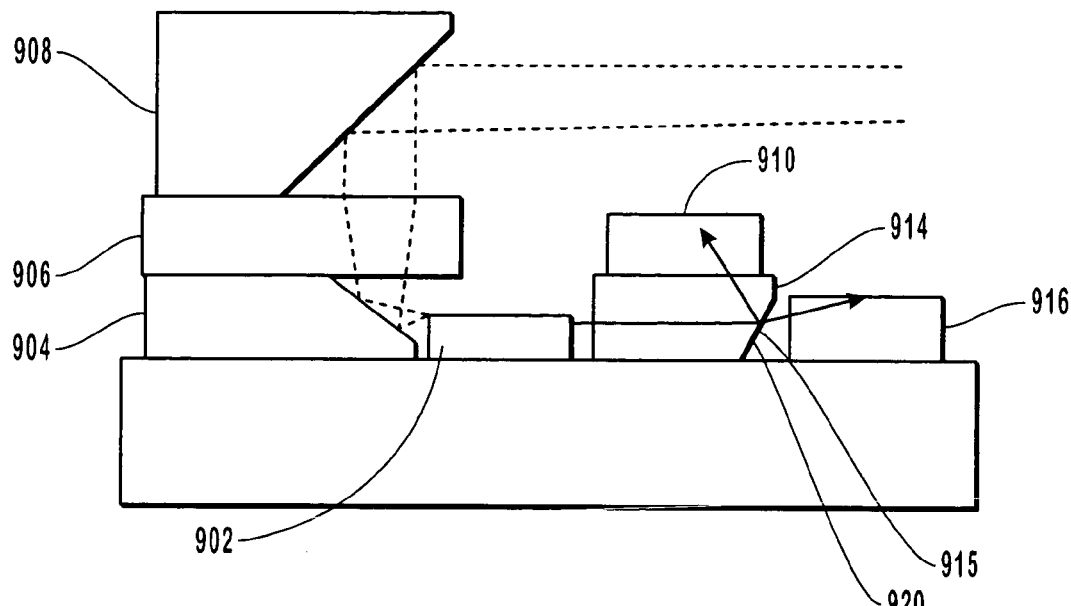
FIG. 11 illustrates yet another embodiment of a wavelength locker that utilizes a beamsplitter to direct the laser light to the photosensitive areas of monitor diodes.

FIG. 11 illustrates another embodiment of a wavelength locker that is similar to the embodiment of FIG. 10. This embodiment also redirects light from the front facet of a laser diode 902 via a first mirror 904, a silicon lens 906, and a second mirror 908. In contrast to the embodiment of FIG. 8, however, the embodiment of FIG. 9 utilizes a beamsplitter 914 that has an angled edge with a dielectric filter 915 on the far side 920 thereof, as opposed to the near side. In order to avoid reflection back into the laser diode, the beamsplitter 914 must be mounted at an angle with respect to the back facet of the laser diode in this embodiment. As illustrated, a portion of the light is directed toward the second monitor diode 916 and a portion of the light is reflected towards the first monitor diode 910. Using the signals detected by the monitor diodes 910 and 916, the wavelength of the laser light can be determined as previously described. The monitor diode 916 is positioned close to the beamsplitter 914 to receive the reflected light.

Figure 12:
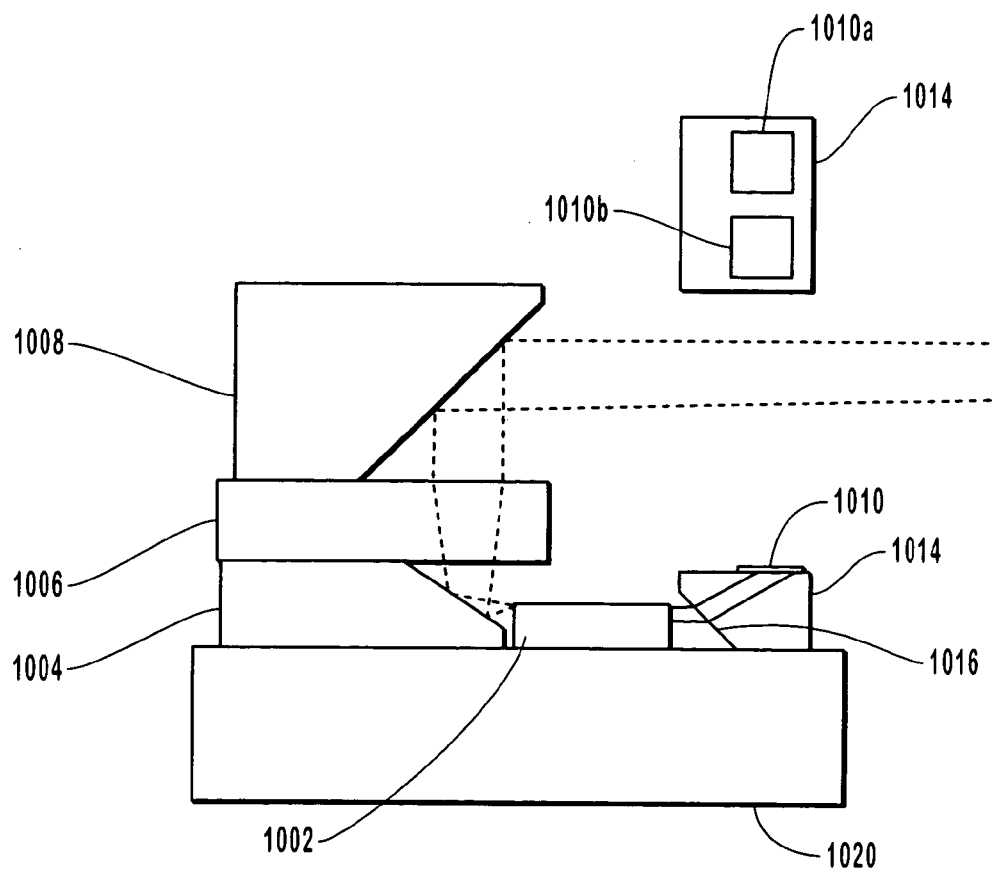
FIG. 12 illustrates another embodiment of a wavelength locker mounted with a laser diode.

In the embodiment of FIG. 12, the wavelength locker includes dielectric filters 1016 that are formed on the monitor diode 1014. Note that, as in other embodiments, the monitor diode either includes two photosensitive areas 1010a, 1010b or two separate monitor diodes (not illustrated). Thus, the dielectric filter that corresponds to a particular photosensitive area of the monitor diode is different than the filter that corresponds to the other photosensitive area of the monitor diode. By using different filters in this manner, the wavelength can be determined and the wavelength of the laser diode 1002 can be corrected whenever it begins to drift from a specified wavelength. In this embodiment it can be noted that a collimating lens may be omitted. In addition, FIG. 12 also depicts redirected light from the front facet of a laser diode 1002 via a first mirror 1004, a silicon lens 1006, and a second mirror 1008.

Figure 13:
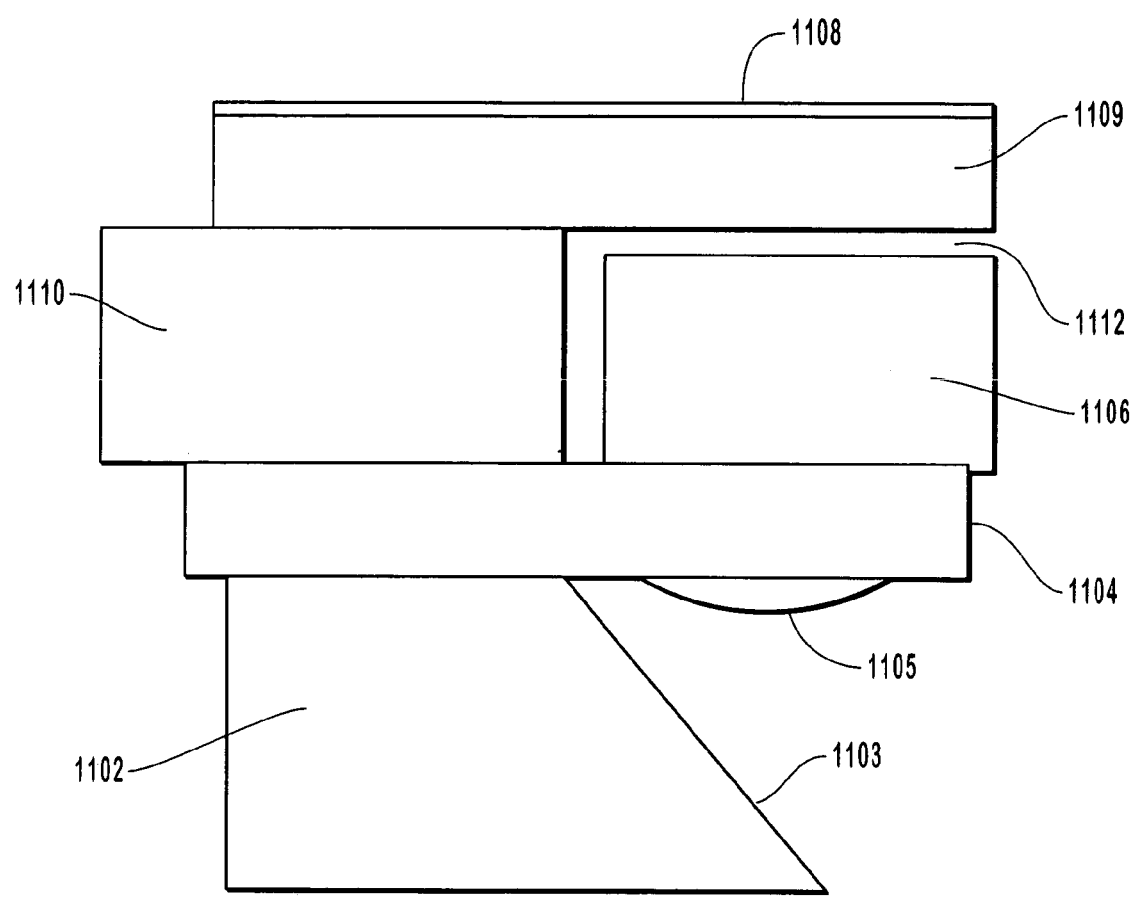
FIG. 13 illustrates yet another embodiment of a wavelength locker mounted with a laser diode.

Referring now to FIG. 13, yet another embodiment of a wavelength locker mounted on a submount is presented in side view. In this embodiment, rather than a prism receiving light from a laser diode and directing that light towards a collimating lens, a reflective surface 1103 on a power monitor detector 1102 is used for that purpose. The power monitor detector 1102 thereby both determines the power of the laser beam and directs reflected light towards optical elements that will determine the wavelength of the laser beam.

More particularly, mounted above the power monitor detector 1102 is a silicon lens with only a single collimating element 1105. Light passing through the collimating element 1105 on lens 1104 is directed through a single filter 1106 and onto the photosensitive surface 1108 on the wavelength detector 1109. A spacer 1110 maintains the proper distance between the lens and the wavelength detector 1108. The filter 1106 may be a coating on a separate filter substrate (as depicted) or comprise of a coating on the silicon lens 1104 as discussed before (FIG. 9). In addition, as also described in FIG. 9 embodiment, the lens 1104 and filter 1106 can be replaced by an appropriate diffractive or holographic optical element, with equivalent functionality described here. An air space 1112 may also be present between the filter 1106, lens 1104, or the replacement diffractive or holographic element described above and the wavelength detector 1109.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A wavelength locker for determining the wavelength of light emitted by a laser diode, the wavelength locker comprising:
   a structure including a surface that receives light from a back facet of a laser diode and redirects at least a first portion of the light;
   a collimating lens supported by the structure including the surface, wherein the collimating lens receives the at least a first portion of the light from the surface;
   a filter layer supported by the collimating lens that comprises a first filter, wherein the filter layer receives collimated light from the lens;
   a first photosensitive area supported by the filter layer that receives filtered light through the first filter and detects a first signal;
   a second photosensitive area supported by the filter layer that receives light that does not pass through the first filter and detects a second signal; and
   a common substrate, wherein the surface, the collimating lens, the filter layer, the first photosensitive area, and the second photosensitive area are supported by the common substrate;
   wherein a detection response of the first photosensitive area and a detection response of the second photosensitive area are used to determine the wavelength and power of the light emitted by the laser diode.

2. A wavelength locker as in claim 1, wherein the lens comprises a first collimating element and a second collimating element, the first photosensitive area receiving collimated light from the first collimating element and the second photosensitive area receiving collimated light from the second collimating element.

3. A wavelength locker as in claim 2, wherein the lens is a single layer disposed directly upon the structure including the reflective surface.

4. A wavelength locker as in claim 1, wherein the filter layer further comprises a second filter, wherein the second filter has a transmission response that is different from a transmission response of the first filter and wherein the second photosensitive area receives light through the second filter.

5. A wavelength locker as in claim 1, wherein the second photosensitive area receives light through an optically passive spacer that is adjacent the first filter.

6. A wavelength locker as in claim 1, wherein the reflective surface comprises a prism.

7. A wavelength locker as in claim 1, wherein the reflective surface comprises one or more dielectric filters.

8. A wavelength locker as in claim 1, wherein the reflective surface comprises a dielectric filter on a beamsplitter that reflects a first portion of the light and transmits a second portion of the light, wherein the first portion of light is directed towards the first photosensitive area and the second portion of light is directed towards the second photosensitive area.

9. A wavelength locker as in claim 8, wherein the dielectric filter is on an angled front facet of the beamsplitter.

10. A wavelength locker as in claim 8, wherein the dielectric filter is on an angled back facet of the beamsplitter.

11. A wavelength locker as in claim 1, wherein the wavelength of the light emitted by the laser diode is determined from a differential between the detection response of the first photosensitive area and the detection response of the second photosensitive area.

12. A wavelength locker as in claim 1,
wherein the power of the light emitted by the laser diode is determined from a sum of the detection response of the first photosensitive area and the detection response of the second photosensitive area.

13. A wavelength locker as in claim 1, wherein the collimating lens is situated directly upon the structure including the surface, the filter layer is situated directly upon the collimating lens, and the photosensitive area is situated directly upon the filter layer.

14. A wavelength locker as in claim 1, wherein the first and second photosensitive areas are incorporated in a single layer in a side-by-side configuration.

15. A wavelength locker as in claim 14, wherein the laser diode is supported by the common substrate.

16. A wavelength locker as in claim 1, further comprising a detector substrate, wherein the first photosensitive area is centrally located and the second photosensitive area substantially surrounds the first photosensitive area in a concentric arrangement.

17. A wavelength locker for determining the wavelength of light emitted by a laser diode, the wavelength locker comprising:
a filter layer that comprises a first filter, wherein the filter layer receives light from the laser diode;
a first photosensitive area that receives filtered light through the first filter and the first photosensitive area detects a first signal; and
a second photosensitive area that receives light that does not pass through the first filter and the second photosensitive area detects a second signal, wherein the first photosensitive area and the second photosensitive area are arranged concentrically such that the second photosensitive area at least partially surrounds the first photosensitive area;
wherein a detection response of the first photosensitive area and a detection response of the second photosensitive area are used to determine the wavelength and power of the light emitted by the laser diode.

18. A wavelength locker for determining the wavelength of light emitted by a laser diode, the wavelength locker comprising:
a first photosensitive area supported by a substrate;
a second photosensitive area supported by the substrate and located adjacent to the first photosensitive area;
means for receiving light from a back facet of a laser diode and directing a first portion of the light onto the first photosensitive area and directing a second portion of the light onto the second photosensitive area, wherein the means for receiving and directing light supports at least one of the first and second photosensitive areas; and
an optical filter that modifies the portion of the light that is directed to the first photosensitive area;
wherein the detection response of the first photosensitive area and the detection response of the second photosensitive area are used to determine the wavelength and power of the light emitted by the laser diode.

19. A wavelength locker as in claim 18, wherein the means for receiving light from a back facet of a laser diode and directing a first portion of the light onto the first photosensitive area and a second portion of the light onto the second photosensitive area comprises one or more of a prism, a mirror, a reflective surface, a dielectric filter, a beamsplitter, a lens, a diffractive element, a holographic element, an etalon, and combinations thereof.

20. An optical transceiver, comprising:
a laser diode that emits light from front and back facets thereof;
a controller module that modifies the wavelength of the light based upon a determined wavelength of the light; and
a wavelength locker that determines the wavelength of the light, comprising:
a reflective element comprising a reflective surface that receives light from the back facet of the laser diode;
a first lens that receives the light reflected by the reflective surface, wherein the first lens collimates the light;
a filter layer that includes a first filter, wherein the first filter receives the collimated light from the first lens;
a common substrate, wherein the surface, the collimating lens, the filter layer, the first photosensitive area, and the second photosensitive area are supported by the common substrate; and
a detector supported by the reflective element, the detector including a first photosensitive area and a second photosensitive area, wherein the first photosensitive area receives light through the first filter to detect a first signal and the second photosensitive area receives light that does not pass through the first filter to detect a second signal, wherein the wavelength of the light is determined from differential between the first signal and the second signal.

21. An optical transceiver as in claim 20, wherein the reflective surface comprises a prism.

22. An optical transceiver as in claim 21, further comprising:
a second lens that receives a second portion of the light reflected by the prism, wherein the second lens collimates the second portion of the light;
wherein the second photosensitive area receives the second portion of the light through the second lens.

23. An optical transceiver as in claim 20, wherein the laser diode is mounted upon a laser diode submount, the optical transceiver further comprising a thermoelectric cooler upon which the wavelength locker and the laser diode submount are mounted.

24. An optical transceiver as in claim 23, further comprising a controller in communication with each of the detector and the thermoelectric cooler, wherein the controller controls the temperature of the thermoelectric cooler based upon the wavelength of the light as detected by the detector.

25. An optical transceiver as in claim 20, further comprising:
a first mirror that receives light from the front facet of a laser diode, wherein the first mirror reflects the light;
a lens that receives the reflected light from the first mirror and collimates or focuses the light; and
a second mirror that receives the light from the lens and reflects the light in a desired direction towards other optical components.

* * * * *